United States Patent
Kimura

(10) Patent No.: US 7,966,503 B2
(45) Date of Patent: Jun. 21, 2011

(54) GATEWAY CARD, GATEWAY DEVICE, GATEWAY CONTROL METHOD, AND COMPUTER PRODUCT

(75) Inventor: Masatoshi Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1242 days.

(21) Appl. No.: 10/657,194

(22) Filed: Sep. 9, 2003

(65) Prior Publication Data

US 2004/0053643 A1    Mar. 18, 2004

(30) Foreign Application Priority Data

Sep. 13, 2002 (JP) ................................. 2002-269256

(51) Int. Cl.
G06F 1/26 (2006.01)
G06F 1/32 (2006.01)

(52) U.S. Cl. ...................................... 713/320; 713/300

(58) Field of Classification Search .................. 713/320, 713/300
See application file for complete search history.

(56) References Cited

U.S. PATENT DOCUMENTS

| | | | |
|---|---|---|---|
| 5,548,631 A | | 8/1996 | Krebs et al. |
| 5,742,833 A * | | 4/1998 | Dea et al. ....................... 713/323 |
| 5,835,719 A * | | 11/1998 | Gibson et al. .................. 709/221 |
| 5,903,765 A | | 5/1999 | White et al. |
| 5,958,057 A * | | 9/1999 | Gianni ........................... 713/310 |
| 6,134,665 A * | | 10/2000 | Klein et al. .................... 713/300 |
| 6,240,084 B1 * | | 5/2001 | Oran et al. ..................... 370/352 |
| 6,282,665 B1 * | | 8/2001 | Cruz .............................. 713/320 |
| 6,308,278 B1 * | | 10/2001 | Khouli et al. ................. 713/323 |
| 6,546,496 B1 * | | 4/2003 | Wang et al. .................... 713/322 |
| 6,658,576 B1 * | | 12/2003 | Lee ................................ 713/320 |
| 6,681,244 B1 * | | 1/2004 | Cross et al. ................... 709/203 |
| 6,922,788 B2 * | | 7/2005 | Eberhard et al. .............. 713/320 |
| 7,107,605 B2 * | | 9/2006 | Janik .............................. 725/51 |
| 2001/0004594 A1 | | 6/2001 | Kuroiwa |
| 2001/0021884 A1 * | | 9/2001 | Shinyagaito .................. 700/275 |
| 2002/0068558 A1 * | | 6/2002 | Janik ............................. 455/422 |
| 2002/0083351 A1 * | | 6/2002 | Brabenac ...................... 713/300 |
| 2002/0156899 A1 * | | 10/2002 | Sekiguchi ..................... 709/227 |
| 2004/0019489 A1 * | | 1/2004 | Funk et al. .................... 704/275 |

FOREIGN PATENT DOCUMENTS

JP        7-93061        4/1995

(Continued)

OTHER PUBLICATIONS

Office Action dated Jun. 6, 2006, issued in corresponding Japanese Patent Application No. 2002-269256.

(Continued)

Primary Examiner — Vincent T Tran
(74) Attorney, Agent, or Firm — Westerman, Hattori, Daniels & Adrian, LLP

(57) ABSTRACT

Clients and server are interconnected through a gateway card of a personal computer. The clients and the servers have different communication protocols. When a client makes a request to access a server, the gateway card executes this access request even if the personal computer is in a power-save mode. When a client makes a request to access the personal computer and if the personal computer is in power-save mode, the gateway card changes the mode of the personal computer to a normal mode, executes the access request, and changes the mode of the personal computer to the power-save mode.

20 Claims, 6 Drawing Sheets

FOREIGN PATENT DOCUMENTS

| | | | |
|---|---|---|---|
| JP | 07-170289 | A | 7/1995 |
| JP | H07-170289 | | 7/1995 |
| JP | 10-164077 | A | 6/1998 |
| JP | 10-190855 | | 7/1998 |
| JP | 10-240388 | A | 9/1998 |
| JP | 10-312370 | | 11/1998 |
| JP | 2000-165419 | | 6/2000 |
| JP | 2001-168879 | | 6/2001 |
| JP | 2002-108486 | A | 4/2002 |
| JP | 2002-108486 | A | 4/2002 |

OTHER PUBLICATIONS

Japanese Office Action dated Mar. 27, 2007, issued in corresponding Japanese Application No. 2002-269256.

Japanese Office Action dated Aug. 28, 2007 issued in the corresponding Japanese Application No. 2002-269256.

Office Action dated Jun. 25, 2009 issued in corresponding Korean Patent Application No. 10-2003-0062488, with partial English translation.

\* cited by examiner

GATEWAY CARD, GATEWAY DEVICE, GATEWAY CONTROL METHOD, AND COMPUTER PRODUCT

BACKGROUND OF THE INVENTION

1) Field of the Invention

The present invention relates to a gateway card for adjusting communication protocols between different networks.

2) Description of the Related Art

Recently, the personal computers are of course, but even the home appliances such as the televisions and telephones have been equipped with the Internet connection function that makes it possible to connect these home appliances to the Internet.

When a user purchases such an apparatus, it is required to do settings so that the apparatus can be connected to an access point of the Internet. These settings are generally take lot of time and are tedious. Moreover, it is necessary to connect these apparatuses to telephone lines, to computers etc. These connections are generally complex and troublesome.

A gateway device called a home gateway or the like has attracted attention in recent years. What this device does is that it adjusts differences in communication protocols between the network at home and external networks including the Internet.

Precisely, all the devices in the home that have the Internet connection function are connected to this gateway device and the gateway device is connected to the public telephone line or other network. All the devices connected to the gateway device can be connected to the Internet so that tedious settings or complex wiring is not required.

Technology that is similar to the one described above has been disclosed in the Japanese Patent Application Laid-Open Nos. 10-190855, 2001-168879, 7-93061, and 10-312370.

The gateway device saves time and reduces the workload on the user. However, the conventional gateway device has a problem in that it has high power consumption. From the viewpoint of home-use, the high power consumption increases the electric bills and is a great drawback.

SUMMARY OF THE INVENTION

It is an object of this invention to provide a gateway card that consumes less power.

The gateway card according to one aspect of the present invention interconnects an information processor, at least one server via a first network, and at least one client via a second network, the first network and the second network having different communication protocols, the information processor having a normal power mode and a power save mode. This gateway card comprises an access accepting unit that accepts a request from the client to access the server or the information processor; a power mode checking unit that determines whether the information processor is in the normal power mode or in the power save mode; and an access control unit that executes the request from the client, wherein if the request from the client is a request to access the server, the access control unit executes the request even if the power mode checking unit determines that the information processor is in the power save mode.

The gateway card according to another aspect of the present invention interconnects an information processor, at least one server via a first network, and at least one client via a second network, the first network and the second network having different communication protocols, the information processor having a normal power mode and a power save mode. This gateway card comprises an access accepting unit that accepts a request from the client to access the server or the information processor; a power mode checking unit that determines whether the information processor is in the normal power mode or in the power save mode; and an access control unit that executes the request from the client, wherein if the request from the client is a request to access the information processor and, if the power mode checking unit determines that the information processor is in the power save mode, the access control unit instructs the information processor to change the power mode to the normal power mode, executes the request, and instructs the information processor to change the power mode to the power save mode.

These and other objects, features and advantages of the present invention are specifically set forth in or will become apparent from the following detailed descriptions of the invention when read in conjunction with the accompanying drawings.

DETAILED DESCRIPTIONS

Exemplary embodiments of the gateway card, the gateway device, the gateway control method, and the computer program relating to the present invention will be explained in detail below with reference to the accompanying drawings.

Figure 1:
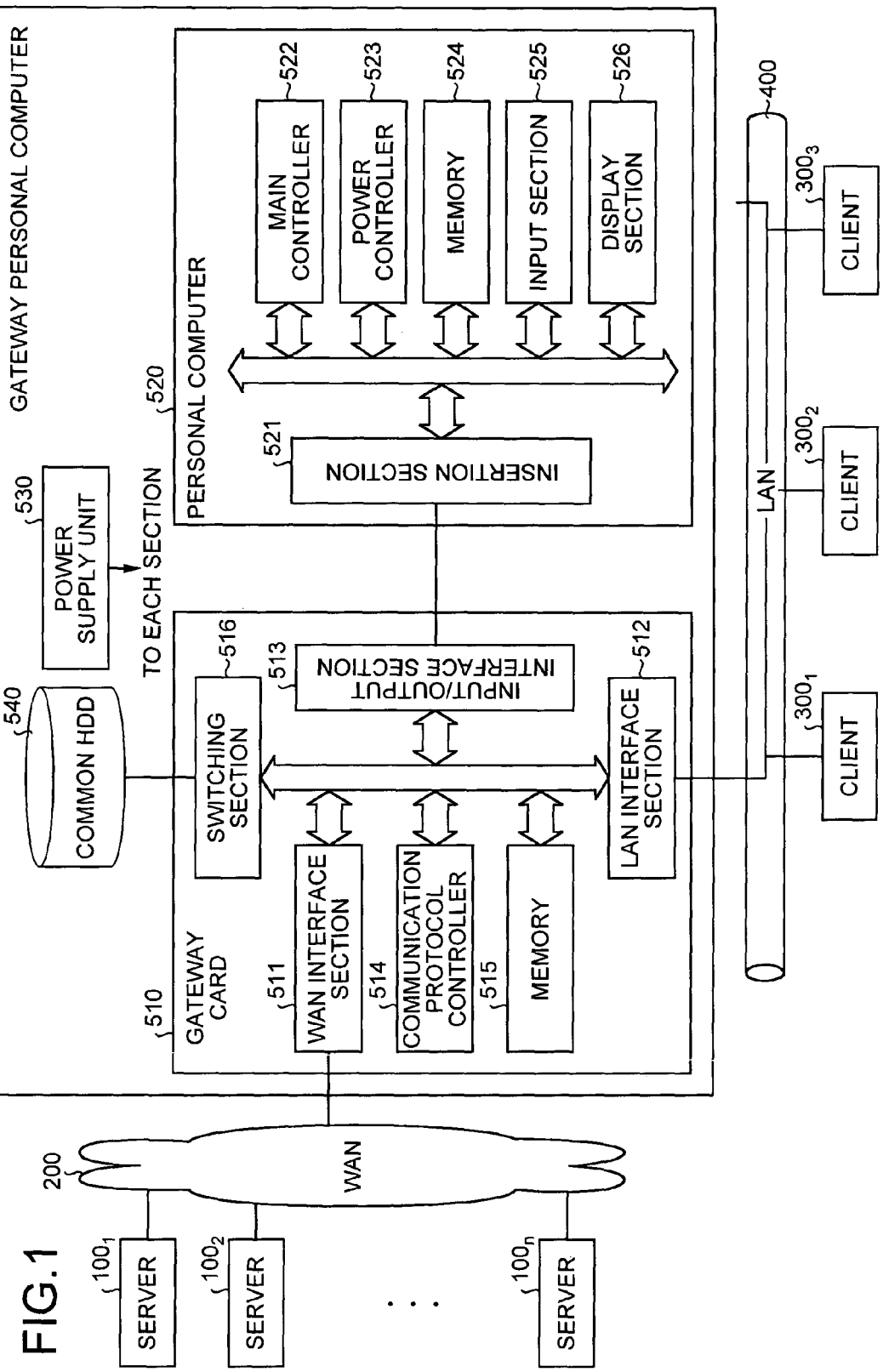
FIG. 1 is a block diagram that shows a structure of a communication system according to an embodiment of the present invention.

FIG. 1 is a block diagram that shows a structure of a communication system according to one embodiment of the present invention. In this communication system, a WAN (Wide Area Network) 200 and a LAN (Local Area Network) 400, having mutually different communication protocols and standards, are connected to each other via a gateway personal computer 500.

The WAN 200 is a network such as the Internet, a public line network, a radio communication network, a CATV (CAble TeleVision) network, and the like. The WAN 200 interconnects remote computers to each other according to predetermined, mutually different communication protocols. The WAN 200 will be explained by taking the Internet as an example.

Servers $100_1$ to $100_n$ are connected to the WAN 200. The servers $100_1$ to $100_n$ are, for example, mail servers, WWW (World Wide Web) servers, and the like. The servers $100_1$ to $100_n$ provide mail services, WWW site services, etc. to clients $300_1$ to $300_3$ via the gateway personal computer 500 and the LAN 400 to be described later.

The clients $300_1$ to $300_3$ are the apparatuses that are equipped with a network connection function and are installed at home. The clients $300_1$ to $300_3$ are, for example, personal computers and electric appliances such as televisions, telephones, and audio apparatuses.

The clients $300_1$ to $300_3$ are connected to the LAN 400. The clients $300_1$ to $300_3$ have a function of receiving various kinds of services by making access to the servers $100_1$ to $100_n$ via the LAN 400, the gateway personal computer 500, and the WAN 200.

Further, the clients $300_1$ to $300_3$ also have a function of receiving various kinds of data by making access to a personal computer 520 via the LAN 400 and the gateway personal computer 500.

Since the clients $300_1$ to $300_3$ are installed inside the home they will be termed as internal apparatuses and, since the servers $100_1$ to $100_n$ are installed outside the home they will be termed as external apparatuses. Thus, the internal apparatuses can make access to the external apparatuses via the gateway personal computer 500 or even to the gateway personal computer 500.

The gateway personal computer 500 is a personal computer installed at home and exclusively used to provide functions of a gateway such as a router function and a bridge function. The gateway is a general term of hardware and software that make it possible to interconnect between the WAN 200 and the LAN 400 by adjusting a difference between the communication protocols of these networks.

The gateway personal computer 500 has a gateway card 510, a personal computer 520, a power supply unit 530, and a common HDD (Hard Disk Drive) 540.

The gateway card 510 is a card-type gateway device that can be detachably inserted into an insertion section 521 of the personal computer 520, and this gateway card provides the functions of the gateway.

The personal computer 520 is a general purpose personal computer. The power supply unit 530 supplies power to each section of the gateway card 510 and the personal computer 520.

The common HDD 540 is a large-capacity storage shared by the gateway card 510 and the personal computer 520. This common HDD 540 stores, for example, the operating systems and the application programs that are used in the gateway card 510 and the personal computer 520 respectively. A switching section 516 executes a switching of the common HDD 540.

The gateway card 510 has a WAN interface section 511 that is connected to the WAN 200. The WAN interface section 511 functions as a communication interface with the WAN 200. Similarly, the gateway card 510 has a LAN interface section 512 that is connected to the LAN 400. The LAN interface section 512 functions as a communication interface with the LAN 400.

The gateway card 510 has an input/output interface section 513 that is detachably inserted into the insertion section 521 of the personal computer 520. The input/output interface section 513 functions as an interface with the personal computer 520.

The gateway card 510 has a communication protocol controller 514 carries out a control to adjust a difference between the communication protocols of the WAN 200 and the LAN 400. That is, the communication protocol controller 514 performs the analysis of communication protocols of the WAN 200 and the LAN 400 to make it interconnection possible.

The gateway card 510 has a memory 515 that is a rewritable read-only memory that requires no back-up power supply and can electrically erase stored data. This memory 515 is a flash EPROM (Erasable Programmable Read Only Memory) or the like. This memory 515 stores system data and other data. When the gateway card 510 provides functions of a router, for example, the system data includes an IP (Internet Protocol) address, DHCP (Dynamic Host Configuration Protocol) data, line data, filtering data, and firmware.

Figure 2:
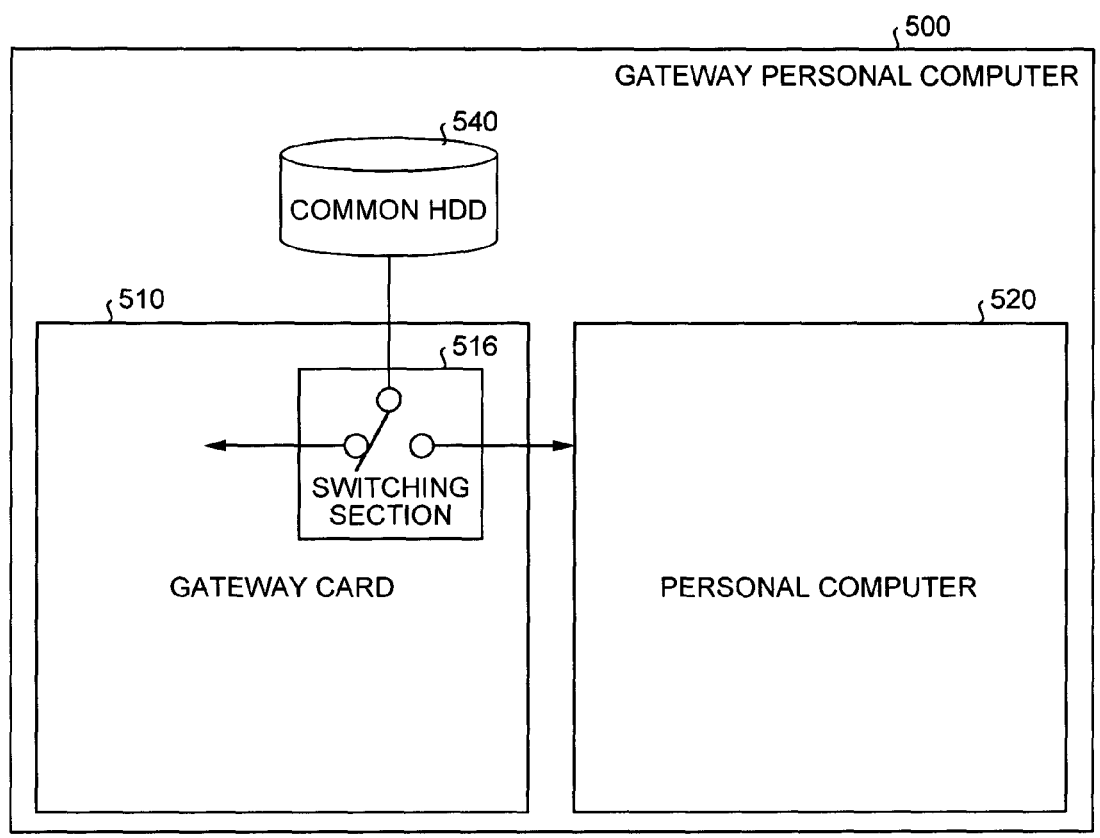
FIG. 2 is a block diagram that shows a detailed structure of the switching section 516 shown in FIG. 1.

FIG. 2 shows the detail structure of the switching section 516. This switching section 516 can connect the common HDD 540 to the gateway card 510 or to the personal computer 520. When the switching section 516 connects the gateway card 510 to the common HDD 540, the gateway card 510 can make access to the common HDD 540. On the other hand, when the switching section 516 connects the gateway card 510 to the personal computer 520, the personal computer 520 can make access to the common HDD 540.

Referring back to FIG. 1, the personal computer 520 has a main controller 522 that controls operation of every section of the personal computer 520. The personal computer 520 has a power controller 523 that can set the operation of the personal computer 520 in a normal operation mode or a power-saving operation mode. A power supply unit 530 supplies power to every section of the personal computer 520 based on the mode set by the power controller 523.

The normal operation mode means that a rated power is supplied to each section of the personal computer 520. The power-saving operation mode means that a minimum necessary power (which is lower than the rated power) is supplied to every section of the personal computer 520. Since low power is supplied in the power-saving operation mode, it is possible to save power and reduce the electric bill in the power-saving operation mode.

The power-saving operation mode is classified into a standby mode and a suspension mode. In the standby mode, a memory 524 in the personal computer 520 stores the work data and, therefore, it is necessary to keep supplying power to this memory 524. On the other hand, in the suspension mode, the common HDD 540 stores the work data, and power supply to this common HDD 540 is set off. Thus, in the suspension mode there is no need to supply power to the personal computer 520. As a result, power consumption in the suspension mode is much smaller than that in the standby mode.

The power controller 523 carries out a control of shifting the power mode from a normal operation mode to a power-saving operation mode when a shift factor occurred, and returning the power mode from the power-saving operation mode to the normal operation mode when a return factor occurred.

The shift factor includes an end of an access from any one of the clients $300_1$ to $300_3$ to the personal computer 520. On the other hand, the return factor includes an access request from any one of the clients $300_1$ to $300_3$ to the personal computer 520.

The memory 524 stores various kinds of data. An input section 525 includes a keyboard and a mouse, and this input section 525 is used to input various kinds of data. A display section 526 is a CRT (Cathode Ray Tube) or an LCD (Liquid Crystal Display), and this display section 526 displays screens and data under the control of the main controller 522.

Figure 3:
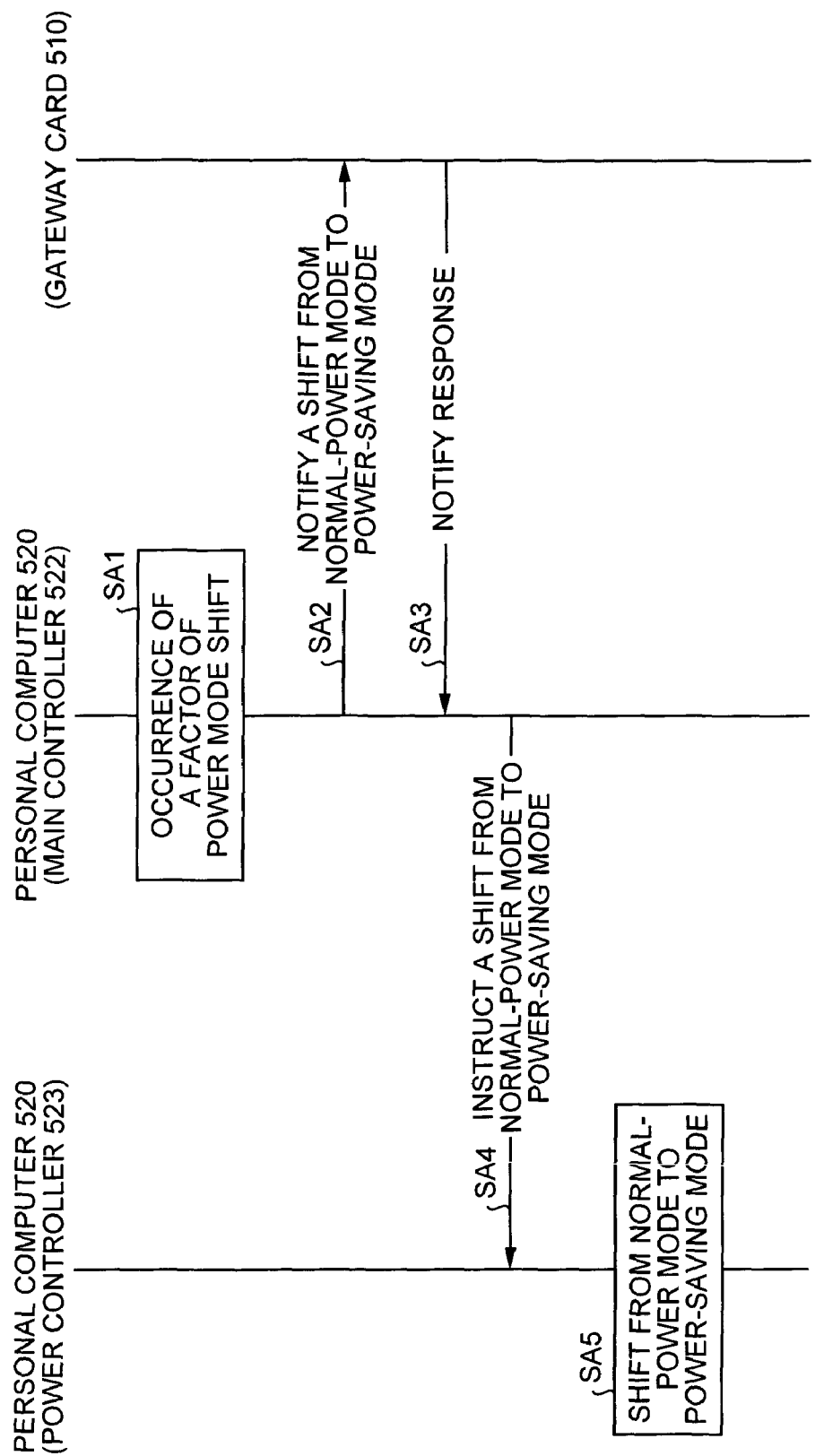
FIG. 3 is a sequence diagram that explains power mode shift operation.
Figure 4:
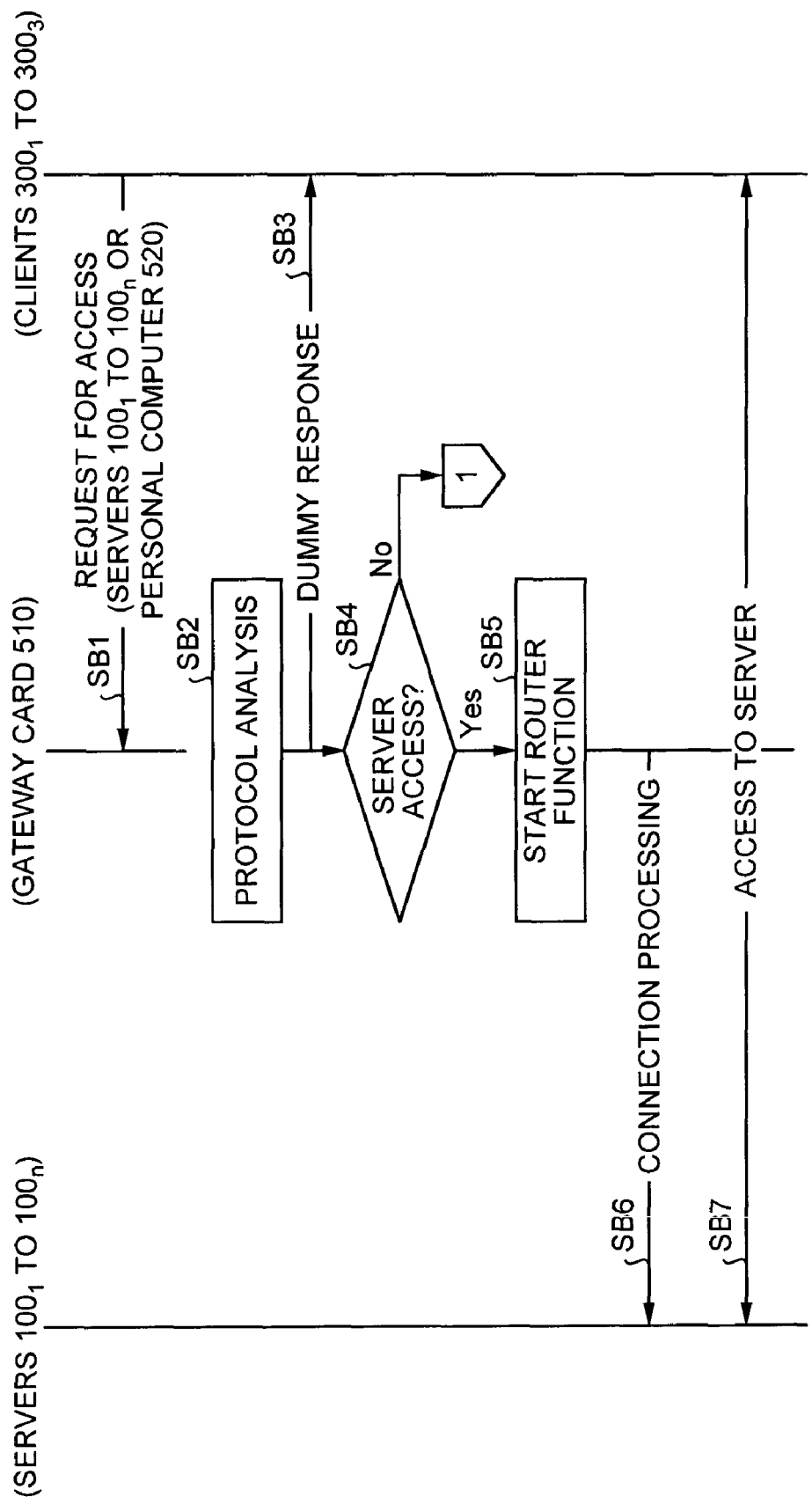
FIG. 4 is a sequence diagram that explains power control operation.
Figure 5:
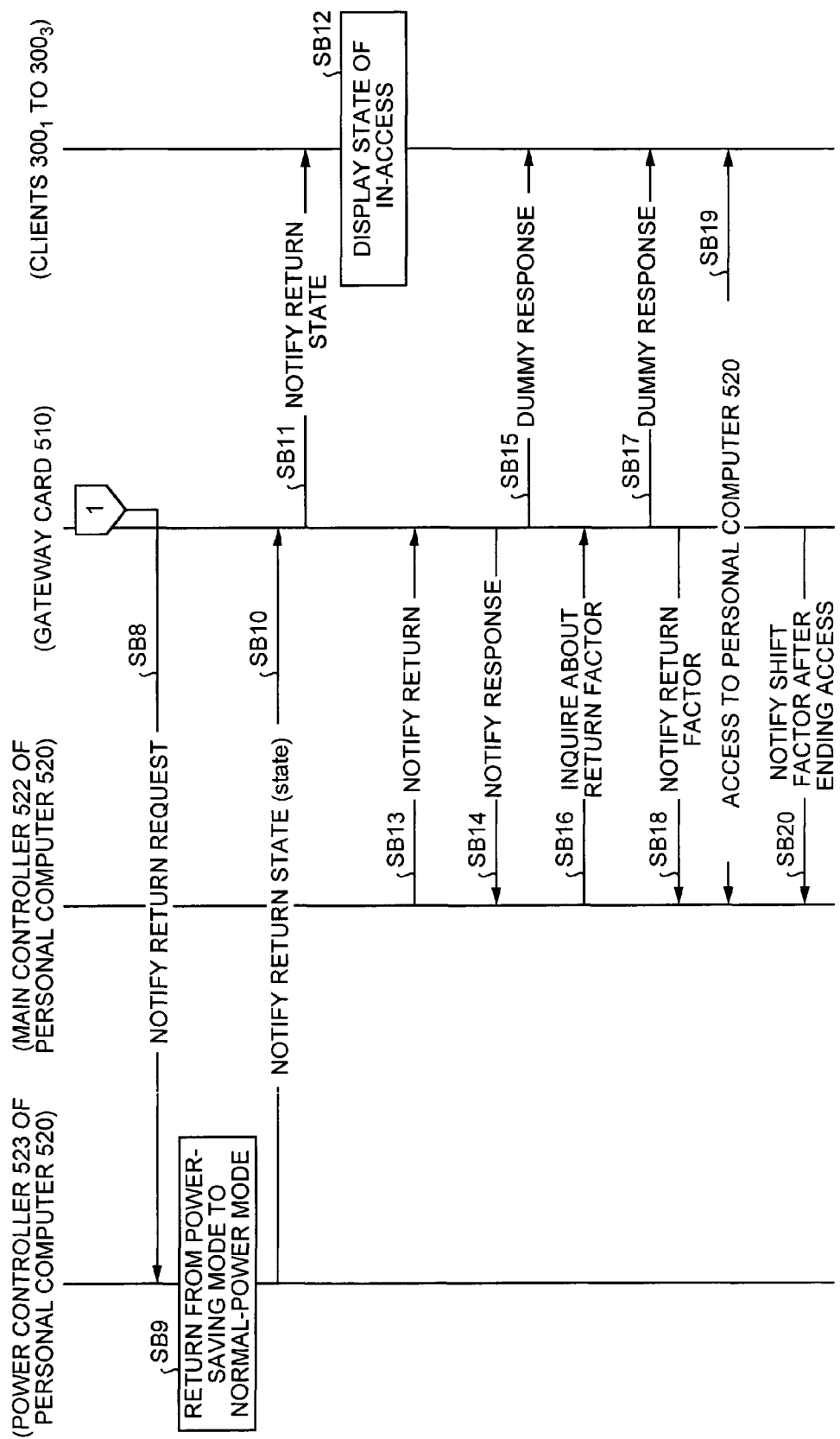
FIG. 5 is a sequence diagram that explains power control operation.

Power mode shift operation and power control operation according to one embodiment of the present invention will be explained with reference to sequence diagrams shown in FIG. 3 to FIG. 5. FIG. 3 is a sequence diagram that explains power mode shift operation according to one embodiment. FIG. 4 and FIG. 5 are sequence diagrams that explain power control operation in the embodiment.

When the power mode shift factor occurred at step SA1 shown in FIG. 3 in a state that the power mode of the personal computer 520 is the normal operation mode, the main controller 522 of the personal computer 520 notifies the gateway card 510 of a shift from the normal operation mode to a power-saving operation mode at step SA2.

At step SA3, the communication protocol controller 514 of the gateway card 510 notifies a response to the main controller 522 of the personal computer 520 to confirm the shift notice.

At step SA4, the main controller 522 instructs the power controller 523 to shift the power mode from the normal operation mode to the power-saving operation mode. At step SA5, the power controller 523 shifts the power mode from the normal operation mode to the power-saving operation mode. As a result, the personal computer 520 can decrease power consumption.

Assume that the power mode of the personal computer 520 is the power-saving operation mode. In this state, at SB1 shown in FIG. 4, the client $300_1$ among the clients $300_1$ to $300_3$ issues to the gateway card 510 a request for making access to the server $100_1$ (via the WAN 200) as an external apparatus among the servers $100_1$ to $100_n$ as external apparatuses and the personal computer 520 as an internal apparatus.

At step SB2, the communication protocol controller 514 of the gateway card 510 analyzes the protocol relating to the access request from the client $300_1$. At step SB3, the communication protocol controller 514 returns a dummy response to the client $300_1$. At step SB4, the communication protocol controller 514 decides whether the access request is a request for making access to the server. In this example, the communication protocol controller 514 sets "Yes" as a result of the decision made at step SB4.

At step SB5, the communication protocol controller 514 starts the router function. At step SB6, the communication protocol controller 514 executes a connection processing to make connection to the server $100_1$ via the WAN interface section 511 and the WAN 200. As the personal computer 520 is not used in this instance, the power mode of the personal computer 520 remains in the power-saving operation mode.

At step SB7, the client $300_1$ makes access to the server $100_1$ via the LAN 400, the gateway personal computer 500, and the WAN 200, and receives various kinds of services.

Assume that the power mode of the personal computer 520 is the power-saving operation mode. In this state, at SB1 shown in FIG. 4, the client $300_2$ among the clients $300_1$ to $300_3$ issues to the gateway card 510 a request for making access to the personal computer 520 as an internal apparatus.

At step SB2, the communication protocol controller 514 of the gateway card 510 analyzes the protocol relating to the access request from the client $300_2$. At step SB3, the communication protocol controller 514 returns a dummy response to the client $300_2$. At step SB4, the communication protocol controller 514 decides whether the access request is a request for making access to the server. In this example, the communication protocol controller 514 sets "No" as a result of the decision made at step SB4.

At step SB8 shown in FIG. 5, the communication protocol controller 514 issues to the power controller 523 of the personal computer 520 a return request to return the power mode from the power-saving operation mode to the normal operation mode.

At step SB9, the power controller 523 returns the power mode from the power-saving operation mode to the normal operation mode. As a result, rated power is supplied to each section of the personal computer 520, so that the personal computer 520 wakes up.

At step SB10, the power controller 523 notifies a return state to the gateway card 510. At step SB11, the communication protocol controller 514 notifies the return state to the client $300_2$.

At step SB12, the client $300_2$ displays a state that the client $300_2$ is in the process of making access to the personal computer 520. At step SB13, upon receiving the notice of the return from the power-saving mode to the normal operation mode, the main controller 522 of the personal computer 520 notifies the return to the gateway card 510.

At step SB14, the communication protocol controller 514 of the gateway card 510 notifies a confirmation response to the main controller 522 of the personal computer 520. At step SB15, the communication protocol controller 514 notifies a dummy response to the client $300_2$.

At step SB16, the personal computer 520 inquires the gateway card 510 about a return factor. At step SB17, the communication protocol controller 514 notifies a dummy response to the client $300_2$.

At step SB18, the communication protocol controller 514 of the gateway card 510 notifies the main controller 522 of the return factor that the client $300_2$ made a request for making access to the personal computer 520.

At step SB19, the client $300_2$ makes access to the personal computer 520 via the LAN 400, the LAN interface section 512, and the input/output interface section 513, and downloads data.

When the access from the client $300_2$ to the personal computer 520 ends, at step SB20, the communication protocol controller 514 notifies the personal computer 520 of the shift factor (end of the access) for shifting the power mode from the normal operation mode to the power-saving operation mode.

As a result, at step SA1 shown in FIG. 3, the shift factor of the power mode in the personal computer 520 occurs. The processing at steps SA2 to SA5 is executed subsequently, and the power mode of the personal computer 520 is shifted from the normal operation mode to the power-saving operation mode.

As explained above, according to the above embodiment, when the access request from any one the clients $300_1$ to $300_3$ corresponds to the access to an external apparatus (servers $100_1$ to $100_n$), it is possible to lead the client to make access to this external apparatus in a state that the power mode of the personal computer 520 is maintained in a power-saving operation mode. Therefore, it is possible to reduce power consumption.

Further, according to the above embodiment, when the access request corresponds to the access to the personal computer 520, the client is led to make access to the personal computer 520 in a state that the power mode of the personal computer 520 is returned from the power-saving operation mode to the normal operation mode. The operation mode is shifted from the normal operation mode to the power-saving operation mode after the access ends. Therefore, it is possible to minimize wasteful power consumption in the personal computer 520.

While the embodiment of the present invention has been explained in detail with reference to the drawings, detailed structures of the invention are not limited to this embodiment. Any design alterations within a range not deviating from the gist of the present invention are all included in the present invention.

Figure 6:
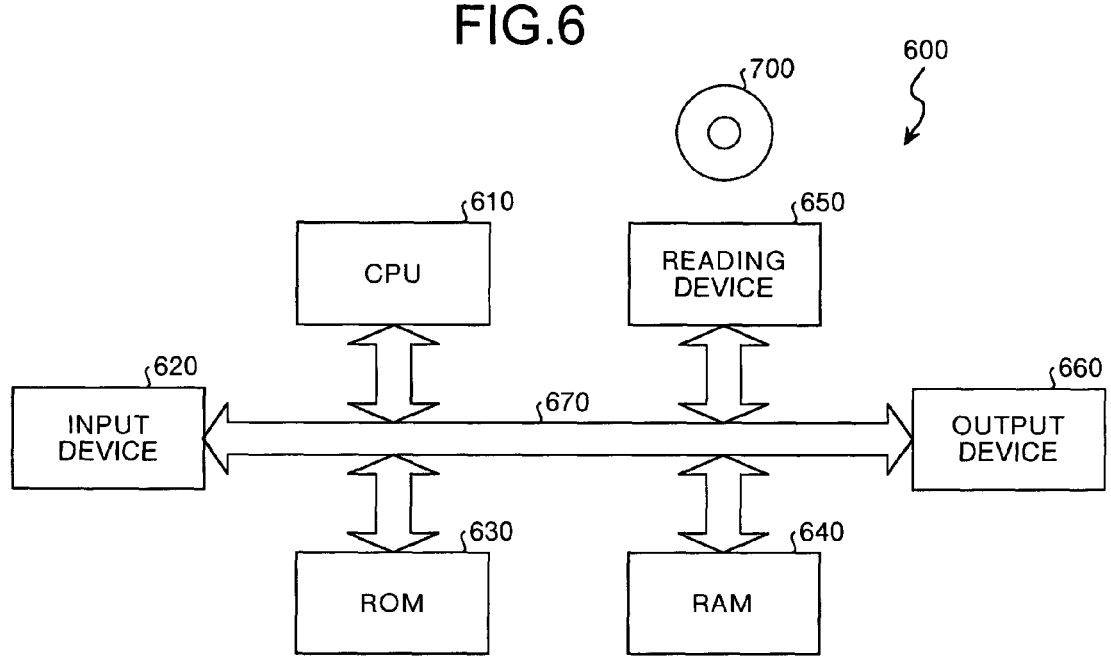
FIG. 6 is a block diagram that shows a structure of a modification of the embodiment.

For example, in the above embodiment, a program for realizing the functions of the gateway personal computer (the gateway card 510, and the personal computer 520) may be recorded on a computer-readable recording medium 700 shown in FIG. 6. A computer 600 shown in this drawing may read the program recorded on the recording medium 700, and execute the program to realize the functions.

The computer 600 shown in the drawing is composed of a CPU (Central Processing Unit) 610 that executes the program, an input device 620 such as a keyboard and a mouse, a ROM (Read Only Memory) 630 that stores various kinds of data, a RAM (Random Access Memory) 640 that stores operation parameters, a reading device 650 that reads the program from the recording medium 700, an output device 660 such as a display and a printer, and a bus 670 that connects between the devices.

The CPU 610 reads the program recorded on the recording medium 700, via the reading device 650, and executes the program, thereby to realize the above functions. An optical disk, a flexible disk, and a hard disk may be used as the recording medium 700.

As explained above, according to the present invention, when the access request from the apparatus corresponds to the access to an external apparatus, the apparatus is led to make access to this external apparatus in a state that the operation of the information processor is maintained in a power-saving operation mode. Therefore, there is an effect that it is possible to reduce power consumption.

Further, according to the present invention, when the access request corresponds to the access to the information processor, the apparatus is led to make access to the information processor in a state that the operation mode is returned from the power-saving operation mode to the normal operation mode, and the power mode is shifted from the normal operation mode to the power-saving operation mode after the access ends. Therefore, there is an effect that it is possible to minimize wasteful power consumption in the information processor.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A gateway card that is connected to an information processor and that receives and transmits data between different networks, the gateway card comprising:
    an access accepting unit that accepts an access request from an apparatus connected to one of the networks;
    a power mode checking unit that determines whether the information processor is in the normal power mode or in the power save mode; and
    an access control unit that leads the apparatus to make access to an external apparatus connected to another one of the networks and in a state that the operation of the information processor is maintained in a power-saving operation mode, when the access request is accepted in a state that the operation of the information processor is in a power-saving operation mode and also when the access request corresponds to the access to the external apparatus, and the access control unit carries out a control to adjust a difference between communication protocols of said one of the networks and said another one of the networks,
    wherein the access control unit analyzes the protocol relating to the access request and returns a dummy response to the apparatus; the access control unit issues to a power controller of the information processor a return request to return from the power saving operation mode to a normal operation mode when the protocol indicate a request for making access to the information processor and notifies the information processor a shift factor for shifting from the normal operation to the power saving mode after the access ends.

2. The gateway card according to claim 1, wherein when the access request is accepted in a state that the operation of the information processor is in a power-saving operation mode and also when the access request corresponds to the access to the information processor, the access control unit leads the apparatus to make access to the information processor in a state that the operation mode is returned from the power-saving operation mode to the normal operation mode, and shifts the operation mode from the normal operation mode to the power-saving operation mode after the access ends.

3. A gateway card connected to an information processor and that receives and transmits data between different networks, the gateway card comprising:
    an access accepting unit that accepts an access request from an apparatus connected to the networks;
    a power mode checking unit that determines whether the information processor is in the normal power mode or in the power save mode; and
    an access control unit that leads the apparatus to make access to the information processor in a state that the operation mode is returned from the power-saving operation mode to the normal operation mode, when the access request corresponds to the access to the information processor, and shifts the operation mode from the normal operation mode to the power-saving operation mode after the access ends,
    wherein the access control unit analyzes the protocol relating to the access request and returns a dummy response to the apparatus; the access control unit issues to a power controller of the information processor a return request to return from the power saving operation mode to a normal operation mode when the protocol indicate a request for making access to the information processor and notifies the information processor a shift factor for shifting from the normal operation to the power saving mode after the access ends.

4. A gateway control method to be applied to a gateway card connected to an information processor and that receives and transmits data between different networks, the gateway control method comprising:
    an access request receiving step of receiving an access request from an apparatus connected to the networks;
    a power mode checking step of determining whether the information processor is in the normal power mode or in the power save mode; and
    an access control step of leading the apparatus to make access to an external apparatus in a state that the operation of the information processor is maintained in a power-saving operation mode, when the access request is accepted in a state that the operation of the information processor is in a power-saving operation mode and also when the access request corresponds to the access to the external apparatus, and the access control step carrying out a control to adjust a difference between communication protocols of said different networks,
    wherein the access control step includes analyzing the protocol relating to the access request and returning a dummy response to the apparatus; the access control step includes issuing to a power controller of the information processor a return request to return from the power saving operation mode to a normal operation mode when the protocol indicate a request for making access to the information processor and notifying the information processor a shift factor for shifting from the normal operation to the power saving mode after the access ends.

5. The gateway control method according to claim 4, wherein when the access request is accepted in a state that the operation of the information processor is in a power-saving operation mode and also when the access request corresponds to the access to the information processor, at the access control step, the apparatus is led to make access to the information processor in a state that the operation mode is returned from the power-saving operation mode to the normal operation mode, and the operation mode is shifted from the normal operation mode to the power-saving operation mode after the access ends.

6. A gateway control method to be applied to a gateway card connected to an information processor and that receives and transmits data between different networks, the gateway control method comprising:
   an access request receiving step of receiving an access request from an apparatus connected to the networks;
   a power mode checking step of determining whether the information processor is in the normal power mode or in the power save mode; and
   an access control step of leading the apparatus to make access to the information processor in a state that the operation mode is returned from the power-saving operation mode to the normal operation mode, when the access request corresponds to the access to the information processor, and shifting the operation mode from the normal operation mode to the power-saving operation mode after the access ends, and the access control step carrying out a control to adjust a difference between communication protocols of said different networks,
   wherein the access control step includes analyzing the protocol relating to the access request and returning a dummy response to the apparatus; the access control step includes issuing to a power controller of the information processor a return request to return from the power saving operation mode to a normal operation mode when the protocol indicate a request for making access to the information processor and notifying the information processor a shift factor for shifting from the normal operation to the power saving mode after the access ends.

7. A gateway control program to be applied to a gateway card connected to an information processor and that receives and transmits data between different networks, the gateway control program comprising the steps of:
   making an access accepting unit accept an access request from an apparatus connected to the networks;
   making a power mode checking unit determine whether the information processor is in the normal power mode or in the power save mode;
   making an access control unit lead the apparatus to make access to an external apparatus in a state that the operation of the information processor is maintained in a power-saving operation mode, when the access request is accepted in a state that the operation of the information processor is in a power-saving operation mode and also when the access request corresponds to the access to the external apparatus, and carrying out a control to adjust a difference between communication protocols of said different networks, and
   making the access control unit analyze the protocol relating to the access request and returning a dummy response to the apparatus; making the access control unit issue to a power controller of the information processor a return request to return from the power saving operation mode to a normal operation mode when the protocol indicate a request for making access to the information processor and notify the information processor a shift factor for shifting from the normal operation to the power saving mode after the access ends.

8. The gateway control program according to claim 7, wherein when the access request is accepted in a state that the operation of the information processor is in a power-saving operation mode and also when the access request corresponds to the access to the information processor, the access control unit leads the apparatus to make access to the information processor in a state that the operation mode is returned from the power-saving operation mode to the normal operation mode, and shifts the operation mode from the normal operation mode to the power-saving operation mode after the access ends.

9. A gateway control program to be applied to a gateway card connected to an information processor and that receives and transmits data between different networks, the gateway control program comprising the steps of:
   making an access accepting unit accept an access request from an apparatus connected to the networks;
   making a power mode checking unit determine whether the information processor is in the normal power mode or in the power save mode;
   making an access control unit lead the apparatus to make access to the information processor in a state that the operation mode is returned from the power-saving operation mode to the normal operation mode, when the access request corresponds to the access to the information processor, and shifts the operation mode from the normal operation mode to the power-saving operation mode after the access ends, and carrying out a control to adjust a difference between communication protocols of said different networks, and
   making the access control unit analyze the protocol relating to the access request and returning a dummy response to the apparatus; making the access control unit issue to a power controller of the information processor a return request to return from the power saving operation mode to a normal operation mode when the protocol indicate a request for making access to the information processor and notify the information processor a shift factor for shifting from the normal operation to the power saving mode after the access ends.

10. A gateway device with an information processor, and a gateway section connected to the information processor and that receives and transmits data between different networks, the gateway section comprises:
    an access accepting unit that accepts an access request from an apparatus connected to one of the networks;
    a power mode checking unit that determines whether the information processor is in the normal power mode or in the power save mode; and
    an access control unit that leads the apparatus to make access to an external apparatus connected to another one of the networks and in a state that the operation of the information processor is maintained in a power-saving operation mode, when the access request is accepted in a state that the operation of the information processor is in a power-saving operation mode and also when the access request corresponds to the access to the external apparatus, and the access control unit carries out a control to adjust a difference between communication protocols of said one of the networks and said another one of the networks,
    wherein the access control unit analyzes the protocol relating to the access request and returns a dummy response to the apparatus; the access control unit issues to a power controller of the information processor a return request to return from the power saving operation mode to a normal operation mode when the protocol indicate a request for making access to the information processor and notifies the information processor a shift factor for shifting from the normal operation to the power saving mode after the access ends.

11. The gateway device according to claim 10, wherein when the access request is accepted in a state that the operation of the information processor is in a power-saving operation mode and also when the access request corresponds to the access to the information processor, the access control unit issues a return notice to return the operation of the information processor from the power-saving operation mode to the normal operation mode, then leads the apparatus to make access to the information processor, and issues a shift notice to shift the operation mode from the normal operation mode to the power-saving operation mode after the access ends, and the power control unit returns the operation mode from the power-saving operation mode to the normal operation mode based on the return notice, and shifts the operation mode from the normal operation mode to the power-saving operation mode based on the shift notice.

12. A gateway device with an information processor, and a gateway section connected to the information processor and that receives and transmits data between different networks, the gateway section comprises:
an access accepting unit that accepts an access request from an apparatus connected to the networks;
a power mode checking unit that determines whether the information processor is in the normal power mode or in the power save mode; and
an access control unit that issues a return notice to return the operation of the information processor from the power-saving operation mode to the normal operation mode, and leads the apparatus to make access to the information processor, when the access request corresponds to the access to the information processor, and issues a shift notice to shift the operation mode from the normal operation mode to the power-saving operation mode after the access ends,
wherein the access control unit analyzes the protocol relating to the access request and returns a dummy response to the apparatus; the access control unit issues to a power controller of the information processor a return request to return from the power saving operation mode to a normal operation mode when the protocol indicate a request for making access to the information processor and notifies the information processor a shift factor for shifting from the normal operation to the power saving mode after the access ends.

13. A gateway control method to be applied to a gateway device with an information processor, and a gateway section connected to the information processor and that receives and transmits data between different networks,
the gateway section executes the steps comprising:
an access request receiving step of receiving an access request from an apparatus connected to the networks;
a power mode checking step of determining whether the information processor is in the normal power mode or in the power save mode; and
an access control step of leading the apparatus to make access to an external apparatus in a state that the operation of the information processor is maintained in a power-saving operation mode, when the access request is accepted in the state that the operation of the information processor is in the power-saving operation mode and also when the access request corresponds to the access to the external apparatus, and the access control step carrying out a control to adjust a difference between communication protocols of said different networks,
wherein the access control step includes analyzing the protocol relating to the access request and returning a dummy response to the apparatus; the access control step includes issuing to a power controller of the information processor a return request to return from the power saving operation mode to a normal operation mode when the protocol indicate a request for making access to the information processor and notifying the information processor a shift factor for shifting from the normal operation to the power saving mode after the access ends.

14. The gateway control method according to claim 13, wherein when the access request is accepted in a state that the operation of the information processor is in a power-saving operation mode and also when the access request corresponds to the access to the information processor, at the access control step, a return notice to return the operation of the information processor from the power-saving operation mode to the normal operation mode, is issued, then the apparatus is led to make access to the information processor, and a shift notice to shift the operation mode from the normal operation mode to the power-saving operation mode after the access ends, is issued, and at the power control step, the operation mode is returned from the power-saving operation mode to the normal operation mode based on the return notice, and the operation mode is shifted from the normal operation mode to the power-saving operation mode based on the shift notice.

15. A gateway control method to be applied to a gateway device with an information processor, and a gateway section connected to the information processor and that receives and transmits data between different networks,
the gateway section executes the steps comprising:
an access request receiving step of receiving an access request from an apparatus connected to the networks;
a power mode checking step of determining whether the information processor is in the normal power mode or in the power save mode; and
an access control step of issuing a return notice to return the operation of the information processor from the power-saving operation mode to the normal operation mode, and leading the apparatus to make access to the information processor, when the access request corresponds to the access to the information processor, and issuing a shift notice to shift the operation mode from the normal operation mode to the power-saving operation mode after the access ends, and the access control step carrying out a control to adjust a difference between communication protocols of said different networks,
wherein the signal the access control step includes analyzing the protocol relating to the access request and returning a dummy response to the apparatus; the access control step includes issuing to a power controller of the information processor a return request to return from the power saving operation mode to a normal operation mode when the protocol indicate a request for making access to the information processor and notifying the information processor a shift factor for shifting from the normal operation to the power saving mode after the access ends.

16. A gateway control program to be applied to a gateway device with an information processor, and a gateway section connected to the information processor and that receives and transmits data between different networks, the gateway control program comprising the steps of:
- making an access accepting unit accept an access request from an apparatus connected to the networks;
  - making a power mode checking unit determine whether the information processor is in the normal power mode or in the power save mode;
- making an access control unit lead the apparatus to make access to an external apparatus in a state that the operation of the information processor is maintained in a power-saving operation mode, when the access request is accepted in a state that the operation of the information processor is in a power-saving operation mode and also when the access request corresponds to the access to the external apparatus, and carrying out a control to adjust a difference between communication protocols of said different networks; and
- making the access control unit analyze the protocol relating to the access request and returning a dummy response to the apparatus; making the access control unit issue to a power controller of the information processor a return request to return from the power saving operation mode to a normal operation mode when the protocol indicate a request for making access to the information processor and notify the information processor a shift factor for shifting from the normal operation to the power saving mode after the access ends.

17. The gateway control program according to claim 16, wherein when the access request is accepted in a state that the operation of the information processor is in a power-saving operation mode and also when the access request corresponds to the access to the information processor, the access control unit issues a return notice to return the operation of the information processor from the power-saving operation mode to the normal operation mode, then leads the apparatus to make access to the information processor, and issues a shift notice to shift the operation mode from the normal operation mode to the power-saving operation mode after the access ends, and the power control unit returns the operation mode from the power-saving operation mode to the normal operation mode based on the return notice, and shifts the operation mode from the normal operation mode to the power-saving operation mode based on the shift notice.

18. A gateway control program to be applied to a gateway device with an information processor, and a gateway section connected to the information processor and that receives and transmits data between different networks, the gateway control program comprising the steps of:
- making an access accepting unit accept an access request from an apparatus connected to the networks;
  - making a power mode checking unit determine whether the information processor is in the normal power mode or in the power save mode;
- making an access control unit issue a return notice to return the operation of the information processor from the power-saving operation mode to the normal operation mode, and lead the apparatus to make access to the information processor, when the access request corresponds to the access to the information processor, and issues a shift notice to shift the operation mode from the normal operation mode to the power-saving operation mode after the access ends, and carrying out a control to adjust a difference between communication protocols of said different networks, and
- making the access control unit analyze the protocol relating to the access request and returning a dummy response to the apparatus; making the access control unit issue to a power controller of the information processor a return request to return from the power saving operation mode to a normal operation mode when the protocol indicate a request for making access to the information processor and notify the information processor a shift factor for shifting from the normal operation to the power saving mode after the access ends.

19. A gateway card that interconnects an information processor, at least one server via a first network, and at least one client via a second network, the first network and the second network having different communication protocols, the information processor having a normal power mode and a power save mode, the gateway card comprising:
- an access accepting unit that accepts a request from the client to access the server or the information processor;
- a power mode checking unit that determines whether the information processor is in the normal power mode or in the power save mode; and
- an access control unit that executes the request from the client, wherein if the request from the client is a request to access the server, the access control unit executes the request even if the power mode checking unit determines that the information processor is in the power save mode and carries out a control to adjust a difference between the different communication protocols of said first network and said second network,
- wherein the access control unit analyzes the protocol relating to the access request and returns a dummy response to the apparatus; the access control unit issues to a power controller of the information processor a return request to return from the power saving operation mode to a normal operation mode when the protocol indicate a request for making access to the information processor and notifies the information processor a shift factor for shifting from the normal operation to the power saving mode after the access ends.

20. A gateway card that interconnects an information processor, at least one server via a first network, and at least one client via a second network, the first network and the second network having different communication protocols, the information processor having a normal power mode and a power save mode, the gateway card comprising:
- an access accepting unit that accepts a request from the client to access the server or the information processor;
- a power mode checking unit that determines whether the information processor is in the normal power mode or in the power save mode; and
- an access control unit that executes the request from the client, wherein if the request from the client is a request to access the information processor and, if the power mode checking unit determines that the information processor is in the power save mode, the access control unit instructs the information processor to change the power mode to the normal power mode, executes the request, and instructs the information processor to change the power mode to the power save mode and carries out a control to adjust a difference between the different communication protocols of said first network and said second network,
- wherein the access control unit analyzes the protocol relating to the access request and returns a dummy response to the apparatus; the access control unit issues to a power controller of the information processor a return request to return from the power saving operation mode to a normal operation mode when the protocol indicate a request for making access to the information processor and notifies the information processor a shift factor for shifting from the normal operation to the power saving mode after the access ends.

* * * * *